US008326069B2

(12) United States Patent
Maslov et al.

(10) Patent No.: US 8,326,069 B2
(45) Date of Patent: Dec. 4, 2012

(54) COMPUTING HIGHER RESOLUTION IMAGES FROM MULTIPLE LOWER RESOLUTION IMAGES

(75) Inventors: Oleg Maslov, Nizhny Novgorod (RU); Vadim Pisarevsky, Nizhny Novgorod (RU); Konstantin Rodyushkin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 12/215,921

(22) Filed: Jun. 30, 2008

(65) Prior Publication Data

US 2009/0324118 A1  Dec. 31, 2009

(51) Int. Cl.
*G06K 9/40* (2006.01)
(52) U.S. Cl. ....................................... 382/254
(58) Field of Classification Search .............. 345/3.3, 345/698; 348/208.13; 382/254, 299
See application file for complete search history.

(56) References Cited

U.S. PATENT DOCUMENTS

| 7,016,531 B1 * | 3/2006 | Murching et al. ............ 382/164 |
| 2003/0112347 A1 * | 6/2003 | Wyman ..................... 348/231.99 |
| 2003/0197063 A1 * | 10/2003 | Longacre, Jr. ............. 235/462.08 |
| 2006/0002635 A1 | 1/2006 | Nestares et al. |
| 2008/0080261 A1 | 4/2008 | Shaeffer et al. |
| 2008/0122946 A1 | 5/2008 | Sung et al. |
| 2008/0143744 A1 | 6/2008 | Agarwala |
| 2008/0177994 A1 * | 7/2008 | Mayer ............................... 713/2 |
| 2008/0298639 A1 * | 12/2008 | Tsunekawa et al. .......... 382/107 |
| 2009/0080805 A1 * | 3/2009 | Tanaka et al. ................. 382/299 |
| 2009/0256918 A1 * | 10/2009 | Rabinowitz et al. ....... 348/208.4 |

FOREIGN PATENT DOCUMENTS

| CN | 1734500 | 2/2006 |
| CN | 101098399 | 1/2008 |
| EP | 1811453 | 7/2007 |
| EP | 1811453 A1 * | 7/2007 |

OTHER PUBLICATIONS

Korean Patent Office, International Search Report and Written Opinion issued in corresponding PCT Application No. PCT/US2009/048241, 9 pages, Jan. 21, 2010.
Chinese Office Action received for Chinese Patent Application No. 200910159436.4, dated Apr. 21, 2011, 15 pages.
Chinese Office Action received for Chinese Patent Application No. 200910159436.4, dated Mar. 1, 2012, 11 pages.

* cited by examiner

*Primary Examiner* — Gregory F Cunningham
(74) *Attorney, Agent, or Firm* — Trop, Pruner & Hu, P.C.

(57) ABSTRACT

Super-resolution images may be produced by dividing a higher resolution image into a set of non-overlapping rectangular tiles of substantially the same size. Then, each pixel in each lower resolution image is mapped to the higher resolution image and it is determined which tiles are mapped to which lower resolution image pixels. A continuous buffer may be allocated for each tile and the relevant lower resolution pixels may be stored, together with optical flow vectors, in that continuous buffer. Then, the determination of gradients may use the information now stored in the buffer to facilitate symmetric multiprocessing using multi-core processors.

24 Claims, 3 Drawing Sheets

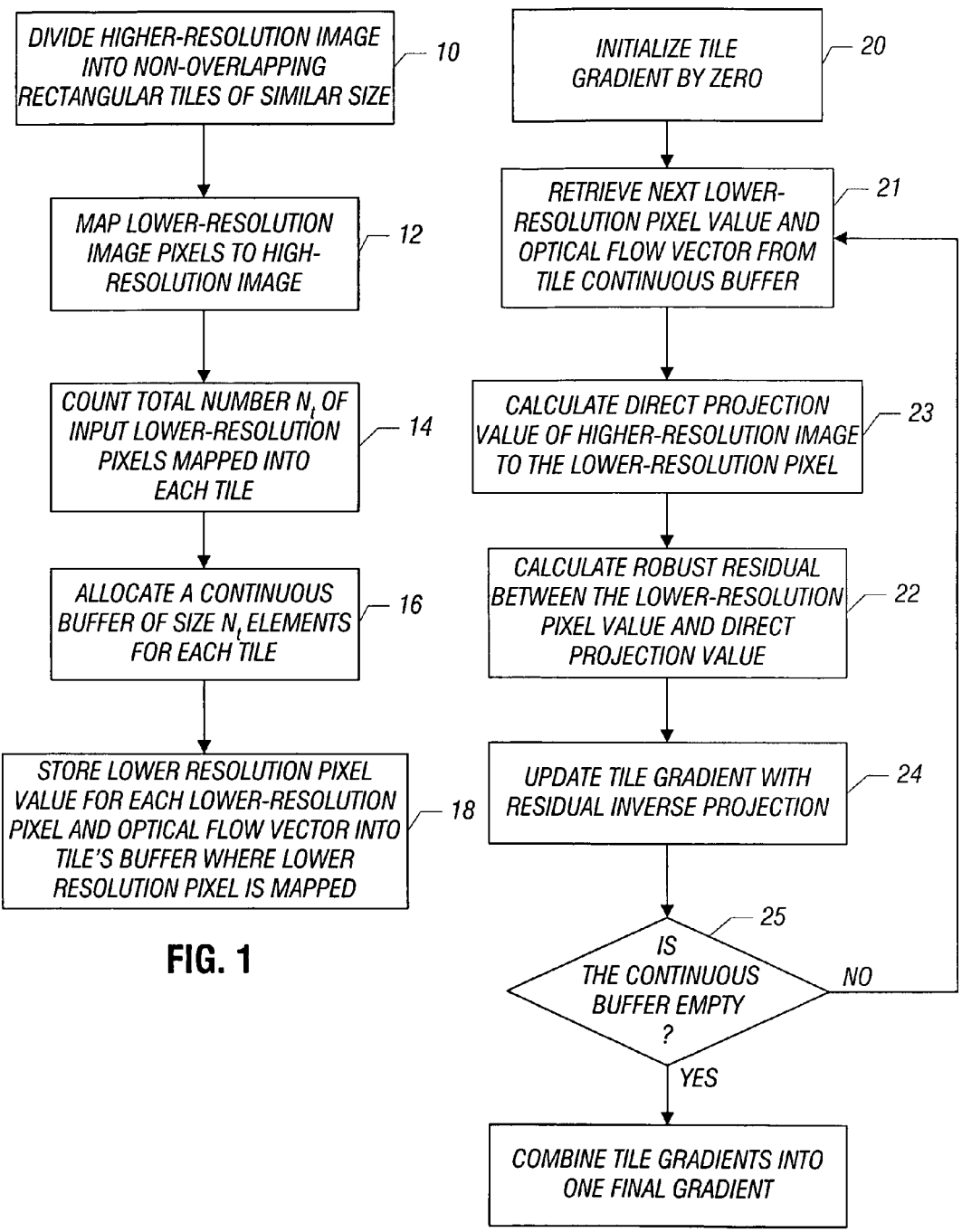

COMPUTING HIGHER RESOLUTION IMAGES FROM MULTIPLE LOWER RESOLUTION IMAGES

BACKGROUND

This relates generally to generating so-called super-resolution images which are higher resolution images based on multiple lower resolution images.

In electronic imaging applications, images with higher resolution are more desirable. Images with higher resolution have greater pixel density and, hence, show greater detail than lower resolution images of the same scene. Higher resolution images have many applications, including medical imaging, satellite imaging, computer vision, video surveillance, face recognition, car plate number extraction and recognition, and converting digital versatile disk video to high density television, to mention a few examples.

In super-resolution image reconstruction, multiple observed lower resolution images or frames of a scene are used to create a higher resolution image. The lower resolution images may be different views of the same scene. They may be obtained from the same camera, for example, while introducing small, so-called sub-pixel shifts in the camera location from frame to frame, or capturing a small amount of motion in the scene. Alternatively, the low resolution images may be captured using different cameras aimed at the same scene. A resultant high resolution image is then reconstructed by aligning and properly combining the low resolution images so that additional image information is obtained. The process may also include image restoration, where de-blurring and de-noising operations are performed as well.

The reconstruction of the resultant high resolution image is a difficult problem because it belongs to the class of inverse, ill-posed mathematical problems. The needed signal processing may be interpreted as being the reverse of the so-called observation model, which is a mathematically deterministic way to describe the formation of low resolution images of a scene based upon known camera parameters. Since the scene is approximated by an acceptable quality high resolution image of it, the observation model is usually defined as relating a high resolution discrete image of the scene to its corresponding low resolution images. This relationship may be given as a concatenation of geometric transform, a blur operator, and down-sampling operator, plus an additive noise term.

BRIEF DESCRIPTION OF THE DRAWINGS

FIG. 1 is a flow diagram for a re-packing algorithm in accordance with one embodiment of the present invention;

FIG. 2 is a flow chart for the gradient computation in accordance with one embodiment of the present invention;

DETAILED DESCRIPTION

Figure 3:
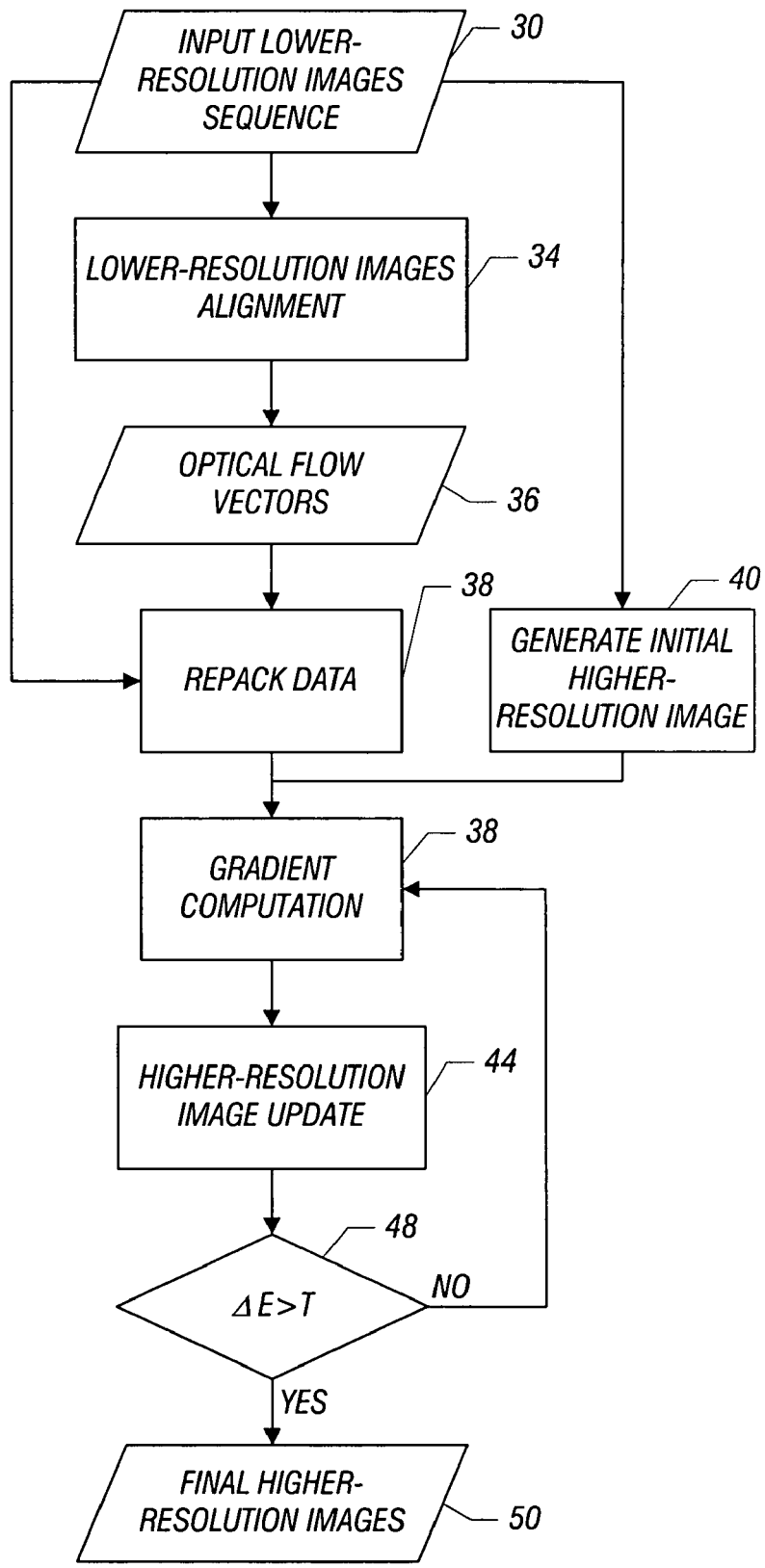
FIG. 3 is a flow chart for non-linear iterative conjugate gradient optimization in accordance with one embodiment.

The observation model, a mathematically deterministic way to describe the formation of lower resolution images of a scene, may be expressed by the mathematical relationship $Y=W*f+n$, where $Y$ is the set of observed lower resolution images and $W$ represents the linear transformation of higher resolution pixels in the higher resolution image $f$ to the lower resolution pixels in $Y$. The letter $n$ represents additive noise having random characteristics, which may represent, for example, the variation or error between lower resolution images that have been captured by the same camera without any changes in the scene and without any changes to camera or lighting settings. Based on the observation model, the super-resolution image reconstruction estimates the higher resolution image $f$ that corresponds to a given set of lower resolution images $Y$.

A Bayesian estimation process, sometimes referred to as stochastic or probabilistic super-resolution image reconstruction, may be used to estimate $f$, to get the resultant higher resolution image mentioned above. In that case, an "a posteriori" probability function, typically a probability density function, is mathematically defined as $P(f|Y)$, which is the probability of a particular high resolution image $f$, given the set of observed low resolution images $Y$.

Applying a mathematical manipulation called Bayes law, the optimization problem, which is finding a suitable high resolution image $f$, that has the highest probability, given a set of low resolution images or that maximizes the a posteriori probability function, may be rewritten as:

$$P(f|Y)=p(Y|f)*p(f),$$

where $p(f)$ is called the prior probability density function that gives the probabilities of a particular higher resolution image prior to any observation. The prior probability density function indicates what higher resolution images are more likely to occur, based on, for example, statistical characterization of an ensemble of different higher resolution images. The prior probability density function may be a joint probability, defined over all the pixels in a higher resolution image and may be based on statistical data from a large number of images.

The a posteriori probability function, called the likelihood function, is a probability density function that defines the probabilities of observing lower resolution images that correspond to a particular higher resolution image. The likelihood probability density function may be determined based on the observation model described above where the noise term is typically assumed to have a Gaussian probability distribution. The estimation process becomes one of iteratively determining trial higher resolution images and stopping when there is a convergence, which may signify that a maximum of the a posteriori probability function has been reached.

To define the maximum of the a posteriori probability function, a non-linear iterative conjugate gradient optimization algorithm is used. The conjugate gradient method computes the gradient of the a posteriori probability function at each search iteration. The calculation of the gradient is the most computationally intensive part of the super-resolution algorithm. In typical configurations it takes 80 to 90 percent of the maximization procedure running time.

The conjugate gradient optimization algorithm models noise by a probabilistic, non-Gaussian, robust function. FIG. 3 shows the use of the conjugate gradient method which is an iterative method that provides an acceptable balance between complexity and speed of convergence. The criteria for convergence is delta E less than T (diamond 48), which tests whether the error or difference in the a posteriori probability function between two successive trial higher resolution images, is less than a predefined threshold T. An alternative is to define delta E as the difference between consecutive trial higher resolution images.

The conjugate gradient method computes the gradient of the error function which has two terms in this embodiment, one corresponding to the likelihood probability function and the other to the prior probability density function. The computation of the likelihood probability function gradient (block 38) involves the application of standard image processing operations including geometric warping, a linear filtering, and sub-sampling/up sampling, for example, that model both the forward and the reverse of a low resolution image formation-process.

To compute the likelihood probability density function, an initial, trial higher resolution image is needed. This may be, for example, a combination of one or more input (observed) lower resolution image sequences (block 30) that have been aligned (block 34). The results of this initial alignment are then used with optical flow vectors 36 to repack the data (block 38). Then the gradient is calculated (block 42) using an initial higher resolution image (block 40) and the repacked lower resolution data. Next, the initial higher resolution image is updated at block 44. The goal is to find the higher resolution image which, when re-sampled in the grid of the input lower resolution images, according to the imaging observation model, predicts the input (observed) lower resolution images.

The gradients, computed in block 42, indicate to the iterative process the direction to move, so as to come closer to the peak or trough in the combination of likelihood and prior probability density functions. This movement along the likelihood and prior probability density functions results in a change or update (block 44) to the next higher resolution image, which generates the current trial higher resolution image. The current trial higher resolution image is then inserted into the second equation and compared to the threshold T (diamond 48). If the delta E is still too high, then the gradient computation loop is repeated. This alignment may be evaluated using a conventional technique. Otherwise, if delta E is less than T, the sequence ends (block 50).

To reduce the memory footprint and to improve cache utilization, in some embodiments, the lower resolution pixel data may be rearranged (i.e. repacked) before running the conjugate gradient optimization algorithm (FIG. 3, block 38). In this rearrangement, all of the low resolution pixels may be mapped to a certain area of a higher resolution image and all of the associated data may be put together in a continuous buffer. As used herein, a continuous buffer is a circular buffer or a buffer that has no end. To achieve this rearrangement, the image may be divided into tiles and then the gradient is computed per tile.

Different tiles are processed in parallel with different threads in symmetric multiple processing (SMP) in a multi-core processor. Thus, referring to FIG. 1, initially, the higher resolution image is divided into a set of non-overlapping, rectangular tiles of the same or, substantially the same, size, as indicated in block 10. For each pixel in each lower resolution image, its mapping to the higher resolution image is determined, as indicated in block 12. That higher resolution region may be a 3×3 region in one embodiment. Then, the tile that the region center belongs to is found. The input lower resolution pixels, mapped into each tile, are then counted, as indicated in block 14 to get a count $N_t$. For each tile k, where k is less than the total number of tiles and greater than or equal to zero, a continuous buffer, pool[k], is allocated, as indicated in block 16. The size of the buffer is set equal to $N_t$ elements. The values of the relevant lower resolution pixels, together with the optical flow vectors, are placed in that continuous buffer, where the lower resolution pixel is mapped, as indicated in block 18.

For each pixel in the lower resolution image, the optical flow vector is a two-dimensional vector with a physical offset across a two-dimensional image plane of this pixel between two frames.

After the initial data reorganization, the gradients may then be calculated per tile, as indicated in FIG. 2, using the reorganized data from the sequence of FIG. 1. The gradient describes how far the current higher resolution image is from the estimated higher resolution image. The algorithm of FIG. 2 may be executed in parallel for each tile in a multicore processor, in one embodiment. Each iteration runs separately and in parallel with the other iterations on a processor core assigned to a thread. In some embodiments, a processor with many cores may be utilized that is capable of running many threads. Thus, each loop, indicated in FIG. 2, processes all of the elements of the array assigned to the k-th tile. The elements of the array are the values of the optical flow vector.

After initialization (block 20), a delta is determined as the difference between a derivative of a robust function and a direct projection function (block 22). The direct projection function projects the higher resolution image into lower resolution images. It models the mapping from pixels in the higher resolution image to points in the lower resolution images. The result is a set of lower resolution images.

During the determination of a maximum of the a posteriori probability function on each iteration, the gradient of that function is calculated. To calculate the gradient, a term is determined for assessing the discrepancy between the observed lower resolution pixel value and the current (on the k-th minimization step) direct projection function value of the current higher resolution pixels, which is being estimated.

To minimize the influence of outliers, a robust function may be used to find the optimal optical flow parameters of the direct projection function in some embodiments. Outliers are points that are affected by an unusually high amount of noise at the tail ends of the density of the probability density graph.

There are a number of different robust functions. One robust function is a Cauchy function which is equal to the logarithm of the quantity $1+X^2/\text{sigma}^2$, where sigma is a known parameter. Thus, the derivative of the robust function is $2*X/(\text{sigma}^2+X^2)$. Then, the gradient may be calculated by subtracting from the derivative of the robust function the value of the direct projection function.

Thus, to calculate the delta, the next lower resolution pixel and optical flow vector are retrieved from a tile's continuous buffer. The direct projection of the higher resolution image into the lower resolution pixel is calculated using the retrieved optical flow vector.

Then, the gradient is updated with an inverse projected delta, as indicated in block 24. The inverse projection models mapping from pixels in the lower resolution image to pixels in the higher resolution image. Finally, as indicated in block 26, the gradients calculated for each tile are combined into one gradient image.

Figure 4:
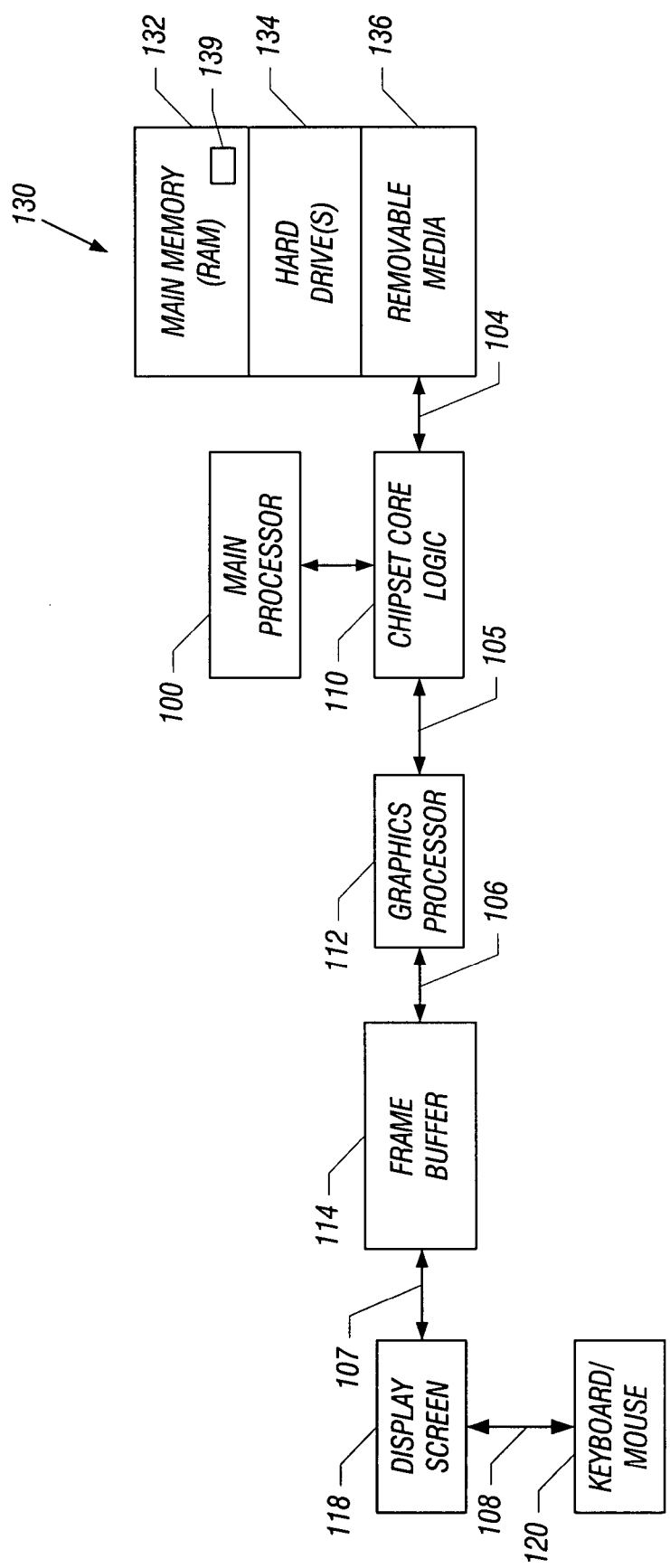
FIG. 4 is a system depiction for one embodiment.

In some embodiments, the layout may be used in symmetric multiprocessing computers with multiple core processors. Referring to FIG. 4, in accordance with some embodiments, a graphics pipeline may include a graphics processor 112, coupled by a bus 106, to a frame buffer 114. A display screen 118 is coupled by a bus 107 to the frame buffer 114 and by a bus 108 to a keyboard or mouse 120.

The graphics processor 112 may be coupled, in one embodiment, to chipset core logic 110 by a bus 105 and a main processor 100. In some embodiments, one or more of the graphics processor or main processor may use symmetric multiprocessing with multiple cores to calculate gradients in parallel.

A storage 130 may be coupled to the chipset core logic and the storage 130 may include a main memory 132, hard drives 134, and removable media 136, as examples.

The sequences depicted in FIGS. 1, 2, and 3 may be implemented as machine readable instructions stored in a portion 139 of the main memory 132 in one embodiment. In addition, the continuous buffer, pool [k], may be established within the main memory 132. However, the buffer and the storage of the sequences, indicated in FIGS. 1 to 3, may also be implemented within the main processor 100, another memory, or in a graphics processor 112, to give additional examples.

In some embodiments, the sequences of FIGS. 1-3 may be implemented in software and, in other embodiments, they may be implemented in hardware. In a software embodiment, the sequences may be implemented by instructions executable by a processor, such as the processor 112 or the processor 100, in the cores of such a processor, using instructions stored in a computer readable medium, such as the region 139. The computer readable medium may be any computer readable storage medium, including magnetic, semiconductor, or optical memory.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   dividing a higher resolution image into multiple areas;
   finding a particular area in the higher resolution image in which two or more lower resolution pixels from one or more lower resolution images are mapped;
   collecting the associated data for said pixels within a buffer;
   before running a conjugate gradient optimization algorithm, rearranging pixel data for the lower resolution images into tiles; and
   computing the gradient per tile to form a super-resolution image.

2. The method of claim 1 including collecting the associated data in a buffer that is continuous.

3. The method of claim 1 including dividing the higher resolution image into a set of non-overlapping rectangular tiles of substantially the same size.

4. The method of claim 3 including, for each pixel in each lower resolution image, finding its mapping to the higher resolution image.

5. The method of claim 4 including finding one or more tiles within the higher resolution image that the pixels from the one or more lower resolution images are mapped into.

6. The method of claim 5 including counting the number of lower resolution pixels mapped to each tile.

7. The method of claim 6 including, for each tile, allocating a continuous buffer of a size equal to the counted number of lower resolution pixels mapped into that tile.

8. The method of claim 7 including calculating a tile within the higher resolution image that a lower resolution pixel is mapped into and placing the value of the lower resolution pixels, together with its optical flow vector, within a continuous buffer for the tile.

9. The method of claim 8 including using the reorganized data to calculate a gradient for each tile.

10. The method of claim 9 including retrieving a low resolution pixel value and optical flow vector from the tile's continuous buffer, using the optical flow vector to calculate a direct projection of the higher resolution image into the lower resolution pixel, and updating the tile's gradient with the inverse projected delta.

11. The method of claim 9 including combining the gradients calculated for each tile into one combined gradient.

12. The method of claim 10 including calculating a gradient for each of a plurality of tiles in parallel on a multicore processor.

13. The method of claim 12 including updating values in a tile's continuous buffer with an inverse projected delta that is equal to a robust function derivative of the difference between a direct projected pixel and a lower resolution pixel.

14. An apparatus comprising:
   a multi-core processor to form a super-resolution image by dividing a higher resolution image into multiple areas and finding a particular area in the higher resolution image in which two or more lower resolution pixels from one or more lower resolution images are mapped, before running a conjugate gradient optimization algorithm, rearranging pixel data for the lower resolution images into tiles, and computing the gradient per tile to form a super-resolution image; and
   a buffer coupled to said processor to collect the associated data for said pixels.

15. The apparatus of claim 14 wherein said buffer is continuous.

16. The apparatus of claim 14, said processor to divide the higher resolution image into a set of non-overlapping rectangular tiles of substantially the same size.

17. The apparatus of claim 16, said processor to find the mapping for each pixel in each lower resolution image to the higher resolution image.

18. The apparatus of claim 17, said processor to find one or more tiles within the higher resolution image that the pixels in one or more the lower resolution images are mapped into.

19. The apparatus of claim 18, said processor to allocate a continuous buffer for each tile.

20. The apparatus of claim 19, said processor to place the values of the lower resolution pixels, together with optical flow vectors, within a continuous buffer for each tile.

21. The apparatus of claim 20, said processor to use the reorganized data to calculate a gradient for each tile.

22. The apparatus of claim 21, said processor to combine the gradients calculated for each tile into one combined gradient.

23. The apparatus of claim 22, said apparatus to calculate a difference between a derivative of a robust function and a direct projection function.

24. The apparatus of claim 23, said processor to update each gradient with an inverse projected delta.

* * * * *